(12) United States Patent
Matsushima

(10) Patent No.: US 9,606,718 B2
(45) Date of Patent: Mar. 28, 2017

(54) ELECTRONIC APPARATUS AND CONTROL METHOD THEREOF

(71) Applicant: CANON KABUSHIKI KAISHA, Tokyo (JP)

(72) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 13/919,429

(22) Filed: Jun. 17, 2013

(65) Prior Publication Data

US 2014/0006985 A1 Jan. 2, 2014

(30) Foreign Application Priority Data

Jun. 27, 2012 (JP) .................................. 2012-144589

(51) Int. Cl.
*G06F 3/14* (2006.01)
*G06F 3/0488* (2013.01)
*G06F 3/0481* (2013.01)

(52) U.S. Cl.
CPC ........ *G06F 3/0488* (2013.01); *G06F 3/04817* (2013.01); *G06F 3/04883* (2013.01)

(58) Field of Classification Search
CPC .................................... G06F 3/14; G06F 3/17
USPC .................. 715/765; 396/89; 348/208.2
See application file for complete search history.

(56) References Cited

U.S. PATENT DOCUMENTS

| 6,937,272 B1 * | 8/2005 | Dance .................... G06F 1/1626 348/208.2 |
| 2008/0165160 A1 | 7/2008 | Kocienda et al. |
| 2009/0167702 A1 | 7/2009 | Nurmi |
| 2010/0166404 A1 * | 7/2010 | Lombardi .............. G03B 17/00 396/89 |
| 2011/0252363 A1 | 10/2011 | Tsuda et al. |

FOREIGN PATENT DOCUMENTS

| CN | 100368970 C | 2/2008 |
| CN | 101393504 A | 3/2009 |
| CN | 101470580 A | 7/2009 |
| CN | 101627361 A | 1/2010 |
| CN | 102236468 A | 11/2011 |

(Continued)

OTHER PUBLICATIONS

Jun. 23, 2014 Japanese Office Action, without an English Translation, that issued in Japanese Patent Application No. 2012-144589.

(Continued)

*Primary Examiner* — Ruay Ho
(74) *Attorney, Agent, or Firm* — Cowan, Liebowitz & Latman, P.C.

(57) ABSTRACT

An electronic apparatus comprises a touch detection unit which detects a touch operation on a display unit, a display control unit which controls to display a specific display item on the display unit, and a control unit which controls to execute a specific function in response to a touch operation as a touch at a position in a first area, at least a portion of which is included in a display area of the specific display item, and controls not to execute the specific function in response to a touch operation as a touch at a position in a second area, at least a portion of which is included in a display area of the specific display item.

27 Claims, 13 Drawing Sheets

(56) References Cited

FOREIGN PATENT DOCUMENTS

| | | |
|---|---|---|
| CN | 102314307 A | 1/2012 |
| CN | 102402327 A | 4/2012 |
| JP | 2005-284379 A | 10/2005 |
| JP | 2006-318393 A | 11/2006 |
| JP | 2009-086601 A | 4/2009 |
| JP | 2011-039990 A | 2/2011 |
| JP | 2011-221821 A | 11/2011 |
| WO | 2012/019350 A | 2/2012 |

OTHER PUBLICATIONS

Partial European Search Report issued on Jan. 29, 2014, that issued in the corresponding European Patent Application No. 13173731.4.
Nov. 27, 2015 Chinese Office Action, with an English Translation, that issued in Chinese Patent Application No. 201310263052.3.
Aug. 12, 2016 Japanese Office Action, without an English Translation, that issued in Japanese Patent Application No. 2015188681.

\* cited by examiner

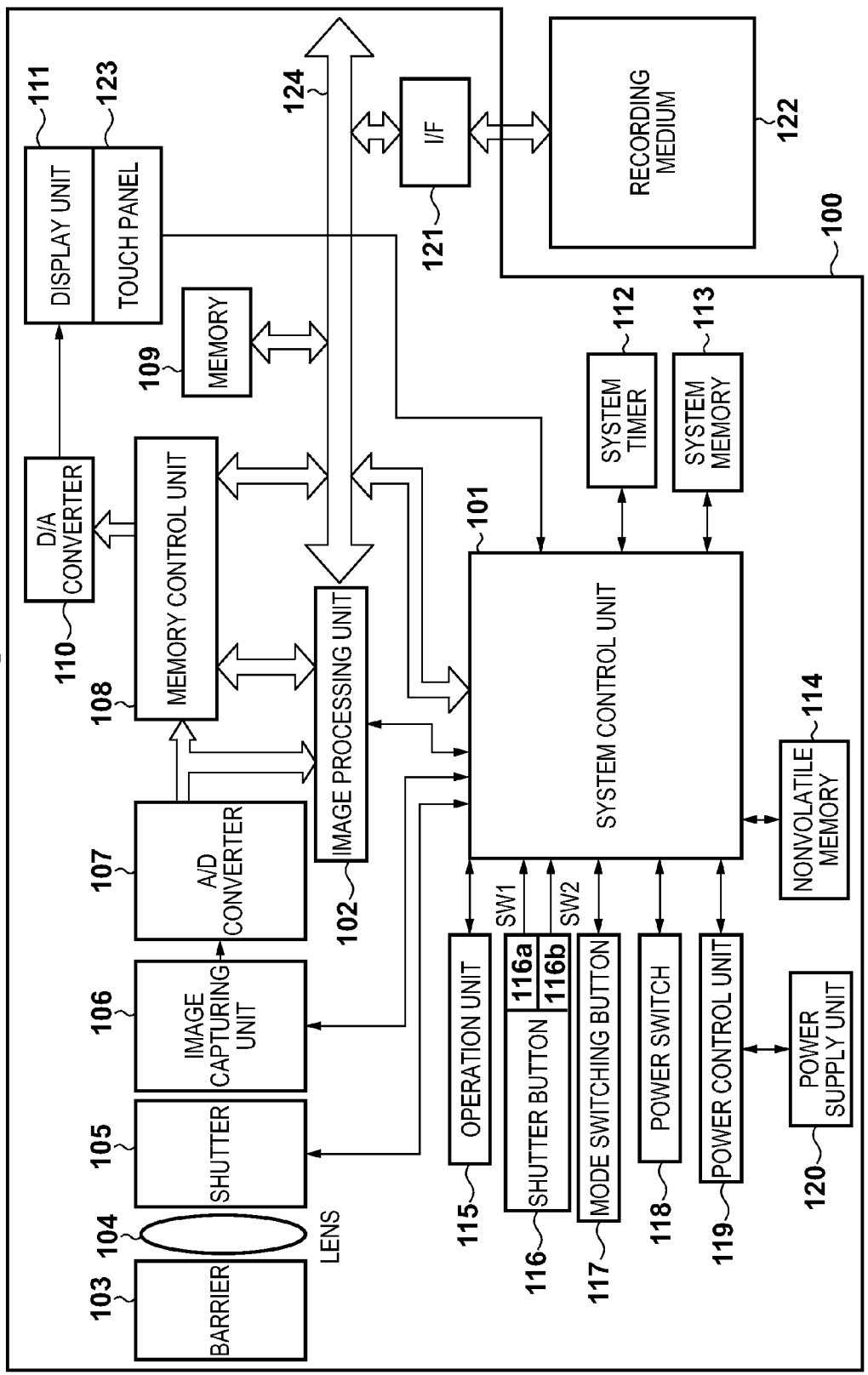

F I G. 10
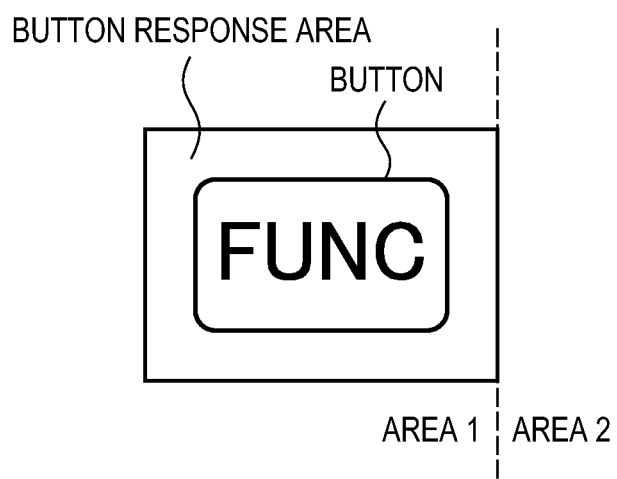

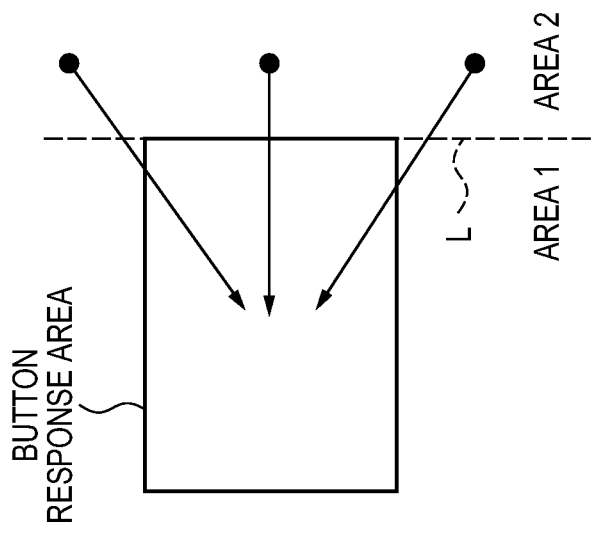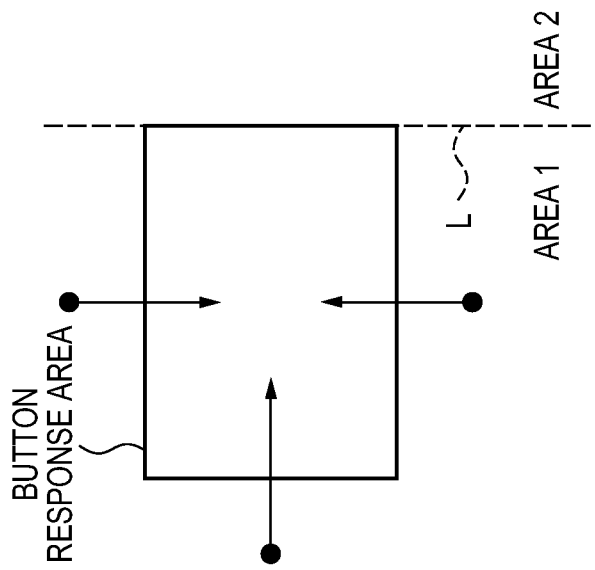

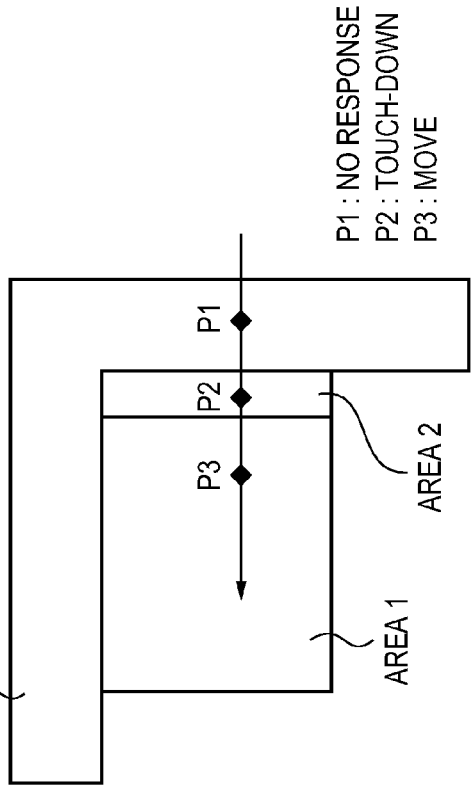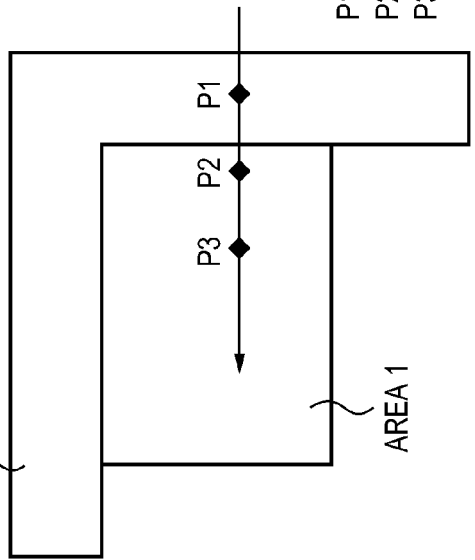

ELECTRONIC APPARATUS AND CONTROL METHOD THEREOF

BACKGROUND OF THE INVENTION

Field of the Invention

The present invention relates to an electronic apparatus having a touch panel and a control method thereof.

Description of the Related Art

In recent years, compact electronic apparatuses such as cameras and mobile phones including touch panels have prevailed. The size of apparatus are being reduced, while simultaneously the size of the display unit is being increased, resulting in a smaller exterior area that can hold the main body of an apparatus. When the user uses the apparatus, he or she unwantedly touches a screen with the finger that holds the main body of the apparatus, and a touch button on the screen responds unexpectedly, thus often causing an erroneous operation. In order to prevent such erroneous operation of a touch panel, Japanese Patent Laid-Open No. 2011-039990 invalidates a button operation when the user keeps pressing a button on the screen for a predetermined time period or longer. Also, Japanese Patent Laid-Open No. 2006-318393 inhibits from executing processing corresponding to a menu item at a touched position when the user makes a touch-up action after an elapse of a predetermined time period since the first touch.

However, Japanese Patent Laid-Open Nos. 2011-039990 and 2006-318393 merely prevent erroneous operations caused when the user keeps pressing a predetermined position on the touch panel for a predetermined time period or longer, and problems of erroneous operations caused by only an instantaneous touch on a button with the finger that holds the main body of the apparatus are still unsolved yet.

SUMMARY OF THE INVENTION

The present invention has been made in consideration of the aforementioned problems, and realizes a technique which can also prevent an erroneous operation caused by an unexpected instantaneous touch on a touch panel.

In order to solve the aforementioned problems, the present invention provides an electronic apparatus comprising: a touch detection unit configured to detect a touch operation on a display unit; a display control unit configured to control to display a specific display item on the display unit; and a control unit configured to control to execute a specific function in response to a touch operation as a touch at a position in a first area, at least a portion of which is included in a display area of the specific display item, and to control not to execute the specific function in response to a touch operation as a touch at a position in a second area, at least a portion of which is included in a display area of the specific display item.

In order to solve the aforementioned problems, the present invention provides an electronic apparatus comprising: a touch detection unit configured to detect a touch operation on a display unit; and a control unit configured to control to execute a specific function when a touch is made at a position in a first area on the display unit, and the touch is released without moving a touch position thereof to outside the first area, to control to execute the specific function when a touch is made at a position in a second area on the display unit, and the touch is released without moving a touch position thereof to outside the second area, to control to execute the specific function when a touch is made at a position in the first area on the display unit, a touch position of the touch moves to the second area, and the touch is released on the second area, and to control not to execute the specific function when a touch is made at a position in a second area on the display unit, a touch position of the touch moves to the first area, and the touch is released on the first area.

In order to solve the aforementioned problems, the present invention provides a control method of an electronic apparatus, comprising: a touch detection step of detecting a touch operation on a display unit; a display control step of controlling to display a specific display item on the display unit; and a control step of controlling to execute a specific function in response to a touch operation as a touch at a position in a first area, at least a portion of which is included in a display area of the specific display item, and controlling not to execute the specific function in response to a touch operation as a touch at a position in a second area, at least a portion of which is included in a display area of the specific display item.

In order to solve the aforementioned problems, the present invention provides a control method of an electronic apparatus, comprising: a detection step of detecting a touch operation on a display unit; and a control step of controlling to execute a specific function when a touch is made at a position in a first area on the display unit, and the touch is released without moving a touch position thereof to outside the first area, controlling to execute the specific function when a touch is made at a position in a second area on the display unit, and the touch is released without moving a touch position thereof to outside the second area, controlling to execute the specific function when a touch is made at a position in the first area on the display unit, a touch position of the touch moves to the second area, and the touch is released on the second area, and controlling not to execute the specific function when a touch is made at a position in a second area on the display unit, a touch position of the touch moves to the first area, and the touch is released on the first area.

According to the present invention, an erroneous operation caused by an unexpected instantaneous touch on a touch panel can also be prevented by invalidating a button operation from a specific direction.

Further features of the present invention will become apparent from the following description of exemplary embodiments (with reference to the attached drawings).

BRIEF DESCRIPTION OF THE DRAWINGS

FIG. 1 is a block diagram of an electronic apparatus according to an embodiment of the present invention;

FIG. 10 is a view showing a button response area according to the third embodiment;

FIGS. 11A and 11B are views showing a touch determination method according to the third embodiment;

FIGS. 15A and 15B are views for explaining a touch determination method according to the fourth embodiment.

DESCRIPTION OF THE EMBODIMENTS

Figure 2B:
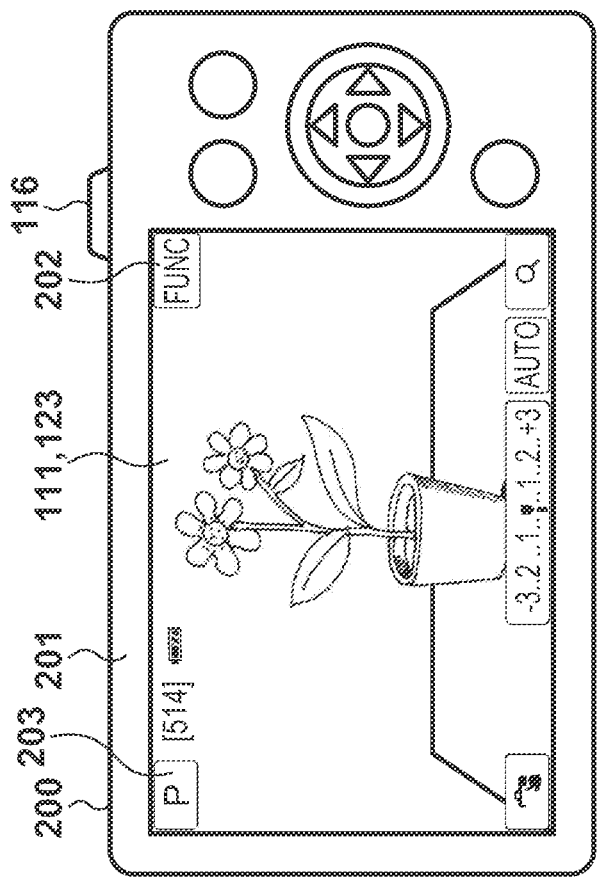
FIGS. 2A and 2B are views showing the outer appearance of the electronic apparatus according to the embodiment.

Embodiments upon application of an electronic apparatus according to the present invention to an image capturing apparatus such as a digital camera will be described in detail hereinafter with reference to the drawings.

<Apparatus Configuration>

The configuration and functions of a digital camera to which an electronic apparatus of the present invention is applied will be described below with reference to FIG. 1 and FIGS. 2A and 2B.

FIG. 1 is a block diagram exemplifying the configuration of the digital camera 100 according to this embodiment. In FIG. 1, a photographing lens 104 includes a zoom lens and a focusing lens. A shutter 105 has a diaphragm function. An image capturing unit 106 is an image sensor, which is constituted by a CCD or CMOS or the like, for converting the optical image of a subject to an electric signal. An A/D converter 107 converts an analog signal to a digital signal. The A/D converter 107 is used to convert an analog signal, which is output from the image capturing unit 106, to a digital signal. A barrier 103 covers the image capturing system (which includes the photographing lens 104) of the digital camera 100, thereby preventing contamination of and damage to the image capturing system that includes the photographing lens 104, shutter 105 and image capturing unit 106.

An image processing unit 102 performs resizing processing, such as predetermined pixel interpolation and reduction, and color conversion processing, with respect to data from the A/D converter 107 or data from a memory control unit 108. Further, the image processing unit 102 performs predetermined calculation processing using the captured image data, and the system control unit 101 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 102 performs predetermined calculation processing using the captured image data, and AWB (Automatic White Balance) processing of TTL type is performed on the basis of the calculation results.

The data from the A/D converter 107 is directly written into a memory 109 via both the image processing unit 102 and the memory control unit 108 or via the memory control unit 108. The memory 109 stores the image data obtained from the image capturing unit 106 and the A/D converter 107, and image display data to be displayed on the display unit 111. The memory 109 has a storage capacity that is sufficient for storing a predetermined number of still images as well as moving images and audio for a predetermined time period.

The memory 109 also functions as a memory for image display (video memory). A D/A converter 110 converts the image display data stored in the memory 109 into an analog signal and applies the display unit 111 with the analog signal. The image display data that was written into the memory 109 is displayed by the display unit 111 via the D/A converter 110. The display unit 111 performs, on a display device such as an LCD, display in accordance with the analog signal from the D/A converter 110. In this manner, the digital signals stored in the memory 109 are converted into analog signals, and the analog signals are successively transmitted to the display unit 111 so as to be displayed thereon, making it possible to realize an electronic view finder (EVF) functionality and to perform through-the lens-image display (live view display).

A nonvolatile memory 114 is, for example, an EEPROM, which is electrically erasable and recordable. In the nonvolatile memory 114, constants and programs, for example, for operating the system control unit 101 are stored. In this context, "programs" may refer to programs for executing various types of flowcharts that will be described later.

The system control unit 101 is a calculation processing device for overall controlling the entire camera 100, and realizes, by executing the programs stored in the nonvolatile memory 114, the procedures of the flowchart that will be described later. The system memory 113 is, for example, a RAM and used also as a work memory where constants and variables for operating the system control unit 101, and the programs read out from the nonvolatile memory 114 are expanded. The system control unit 101 controls the memory 109, the D/A converter 110, the display unit 111, and the like, so as to perform display control.

A system timer 112 is a timer circuit for measuring time periods for various types of controls and the time of an integrated clock.

A mode switching button 117, a first shutter switch 116a, a second shutter switch 116b, and operation units 115 are operation members for inputting various types of instructions into the system control unit 101.

The mode switching button 117 switches the operation mode of the system control unit 101 to any of a still image recording mode, a moving image recording mode, and a reproduction mode. The still image recording mode includes an automatic shooting mode, an automatic scene determination mode, a manual mode, various types of scene modes in which different settings are configured for individual shooting scenes, a program AE mode, a custom mode, and the like. Using the mode switching button 117, the mode is directly switched to any of the plurality of modes included in the still image recording mode. Alternatively, it is also possible to switch, using the mode switching button 117, to the still image recording mode and then to switch, using another operation member, to any of the plurality of modes included in the still image shooting mode. Similarly, also the moving image shooting mode may include a plurality of modes.

While a shutter button 116 provided on the camera 100 is being operated, that is, pressed half-way (the shooting preparation instruction), the first shutter switch 116a is turned on and generates a first shutter switch signal SW1. Upon receiving the first shutter switch signal SW1, the system control unit 101 causes the image processing unit 102 to start the AF (Automatic Focus) processing, the AE (Automatic Exposure) processing, the AWB (Automatic White Balance) processing, the EF (flash pre-emission) processing and the like.

When the operation of the shutter button 116 is completed, that is, the shutter button 116 is pressed fully (the shooting instruction), the second shutter switch 116b is turned on and generates a second shutter switch signal SW2. Upon receiving the second shutter switch signal SW2, the system control unit 101 starts a series of shooting processing from reading out the signal from the image capturing unit 106 to writing of image data to the recording medium 122.

By selecting various functional icons displayed on the display unit 111, appropriate functions for each situation are assigned to the operation units 115, and the operation units 115 thus act as various function buttons. Examples of these function buttons include an end button, a back button, an image scrolling button, a jump button, a narrow-down button, an attribute change button. For example, a menu screen that enables various settings to be made is displayed on the display unit 111 by pressing a menu button. The user can make various settings intuitively by using the menu screen, which is displayed on the display unit 111, four-direction (up, down, left, right) buttons and a SET button.

A power control unit 119 is constituted by, for example, a battery detection circuit, a DC-DC converter, a switch circuit for changing over the block to be supplied with power, and detects a battery has been inserted or not, the type of the battery, and the residual capacity thereof. Further, the power control unit 119 controls the DC-DC converter in accordance with the detection results and an instruction of the system control unit 101, and supplies a necessary voltage for a necessary length of time to each of the units including the recording medium 122.

A power supply unit 120 comprises a primary battery such as an alkaline battery or a lithium battery, a secondary battery such as an NiCd battery, an NiMH battery, or an Li battery, or an AC adaptor. The recording medium interface (I/F) 121 is for interfacing with the recording medium 122 such as the memory card or hard disk. The recording medium 122 is a recording medium such as a memory card for recording shot images, and constituted by a semiconductor memory, a magnetic disk, or the like.

Included among the operation units 115 is also a touch panel 123 as a touch detecting unit capable of detecting a touch operation on the display unit 111. The touch panel 123 and the display unit 111 can be constructed as a single integrated unit. For example, the touch panel 123 is constructed in such a manner that the transmittance of light will not interfere with the display presented by the display unit 111, and it is attached to the uppermost layer of the display face of the display unit 111. In addition, input coordinates on the touch panel 123 and display coordinates on the display unit 111 are correlated. As a result, a GUI can be constructed that makes it possible for the user to directly manipulate the screen displayed on the display unit 111. The system control unit 101 is capable of detecting the following operations performed by contacting the touch panel 123: touching of the panel 123 using a finger or pen (referred to as "touch-down" below); a state in which the touch panel 123 is in contact with a finger or pen (referred to as "touch-on" below); movement of a finger or pen while in contact with the touch panel 123 (referred to as "move" below); lifting of a finger or pen that has been in contact with the touch panel 123 (referred to as "touch-up" below); and a state in which the touch panel 123 is not being touched at all (referred to as "touch-off" below). These operations and position coordinates at which the touch panel 123 is being touched by the finger or pen are communicated to the system control unit 101 through an internal bus 124 and, based upon the information thus communicated, the system control unit 101 determines what kind of operation was performed on the touch panel 123. As for "move", the determination can be made also for every vertical component and horizontal component with regard to the direction of movement of the finger or pen, which is moved on the touch panel 123, based upon a change in the coordinate position. Further, it is assumed that a stroke has been made when "touch-up" is performed following a regular "move" after a "touch-down" on the touch panel 123. A very quick stroke action is referred to as a "flick". A "flick" is an operation in which, with fingers in contact with the touch panel 123, the fingers are moved rapidly over a certain distance and then lifted. In other words, this is a rapid tracing operation in which the fingers are flicked across the surface of the touch panel 123. The system control unit 101 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. Furthermore, the system control unit 101 is capable of detecting an action which is entering into a specific area while performing movement on the touch panel 123 using the finger or pen 123 (referred to as "move-in" below), and detecting an action which is exiting from the specific area while performing movement on the touch panel 123 using the finger or pen 123 (referred to as "move-out" below). It should be noted that the touch panel 123 may employ a method that relies upon any of the following: resistive film, electrostatic capacitance, surface acoustic waves, infrared radiation, electromagnetic induction, image recognition and optical sensing.

Figure 2A:
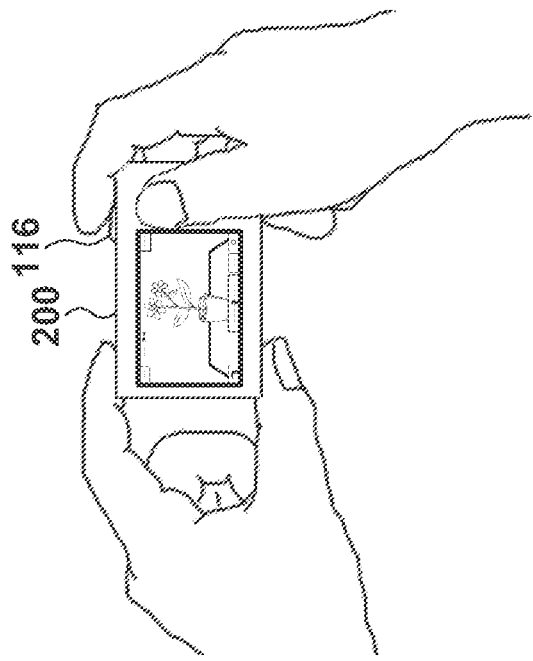

In FIGS. 2A and 2B showing the outer appearance of the digital camera 100 according to this embodiment, FIG. 2A is a rear view of the camera. A camera body 200 includes the display unit 111 and the touch panel 123 which integrally overlaps the display unit 111. Also, a frame member 201 is arranged to surround the display unit 111 as a part of a camera exterior. The frame member 201 falls outside a sensitive range of the touch panel 123, and is an area which does not respond to a touch. The display unit 111 displays a through-the lens-image from the image capturing unit 106 and an image recorded in the recording medium 122, and buttons used to execute functions by touching are superimposed on the through-the lens-image or the recorded image. For example, a FUNC button 202 is displayed at an upper right corner of the display unit 111, and the user can display a camera function setting screen as a function assigned to the FUNC button 202 when he or she touches this button portion. Also, a shooting mode button 203 is displayed at an upper left corner of the display unit 111, and the user can display a shooting mode change screen as a function assigned to the shooting mode button 203 when he or she touches this button portion. Note that an area where when a touch on that area is detected on the touch panel (that is, on a touch detectable area), a function assigned to a button associated with that area is executed is defined as a button response area. By contrast, an area which is assured to detect move-in and move directions (to be described later), and allows touch detection but is not associated with any button (that is, the area which is not a button response area) is defined as a touch response area. That is, the button response area is included in the touch response area, but the touch response area does not always include the button response area.

FIG. 2B shows the fingers which hold the camera body at a shooting timing. When a grip portion of the camera is small, the right thumb often unexpectedly touches the touch panel 123. For example, when the right thumb touches the FUNC button 202, the camera function setting screen is displayed at an unintended timing of the user, and the user may miss a photo opportunity.

Thus, the following embodiments will explain a means for preventing the button from being erroneously operated by the finger which holds the camera body 200 and moves from the frame member 201 of the display unit, which member does not respond to any touch onto the touch panel.

First Embodiment

The first embodiment will explain a method of invalidating a button operation from a specific direction by detecting a move direction on the touch panel.

Figure 3:
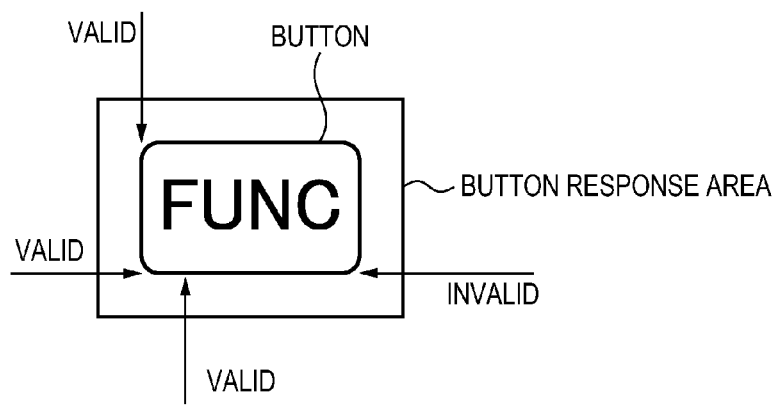
FIG. 3 is a view showing a button response area according to the first embodiment.

FIG. 3 shows the relationship between the button displayed on the touch panel of the display unit and a button response area associated with the button. The button response area may be set to have the same range as the outer shape of the button. However, in this embodiment, the button response area is set to have a range larger than the displayed button in consideration of the size of the touching finger and the precision of a touch position. A function assigned to the button is executed when a touch-down action is detected within the button response area, and a touch-up action is then detected without any move-out action to outside the area and when a touch-up action is detected without any move-out action to outside the area after a move-in action to the button response area is detected. In FIG. 3, move actions from up, down, and left directions with respect to the button response area (first area) are valid to permit execution of the function assigned to the button. On the other hand, a move action from a right direction is invalid to inhibit execution of the function assigned to the button. Thus, a button operation when the finger unexpectedly moves in from the right direction of the display unit is invalid, thus preventing execution of the function by an erroneous operation.

<Move Direction Determination Method>

Figure 4:
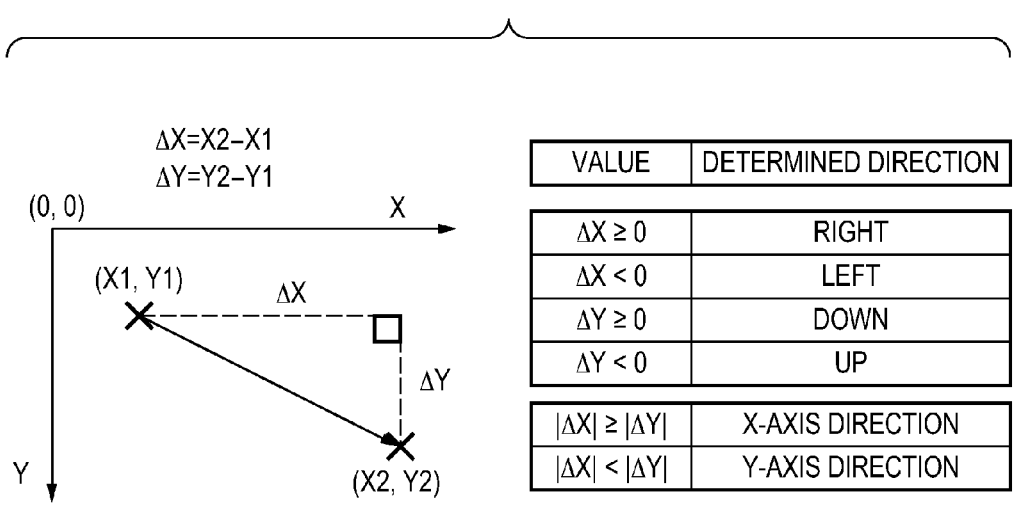
FIG. 4 is a view for explaining a move direction determination method.

The move direction determination method will be described below with reference to FIG. 4. Coordinates of an abscissa X and ordinate Y are defined on the touch panel to have the upper left corner as an origin, and coordinates of a touch on the touch panel are detected at given time intervals. Assuming that coordinates at a time T1 are (X1, Y1) and those at a detection time T2 next to T1 are (X2, Y2), coordinate displacements from the time T1 to the time T2 are calculated as $\Delta X = X2 - X1$ and $\Delta Y = Y2 - Y1$. When $\Delta X \geq 0$, since this means that an X-coordinate component of a move action moves in a positive direction, a right direction of the touch panel is determined; when $\Delta X < 0$, a left direction is determined. Likewise, when $\Delta Y \geq 0$, a down direction is determined; when $\Delta Y < 0$, an up direction is determined. A move direction can be determined by comparing absolute values of X and Y components of the coordinate displacements: when $|\Delta X| \geq |\Delta Y|$, an X-axis direction can be determined; when $|\Delta X| << |\Delta Y|$, a Y-axis direction can be determined. As can be seen from the above description, in order to detect a move-in action from the right direction to the button response area, whether or not conditions $\Delta X < 0$ and $|\Delta X| \geq |\Delta Y|$ are satisfied can be determined.

<Touch Processing>

Figure 5:
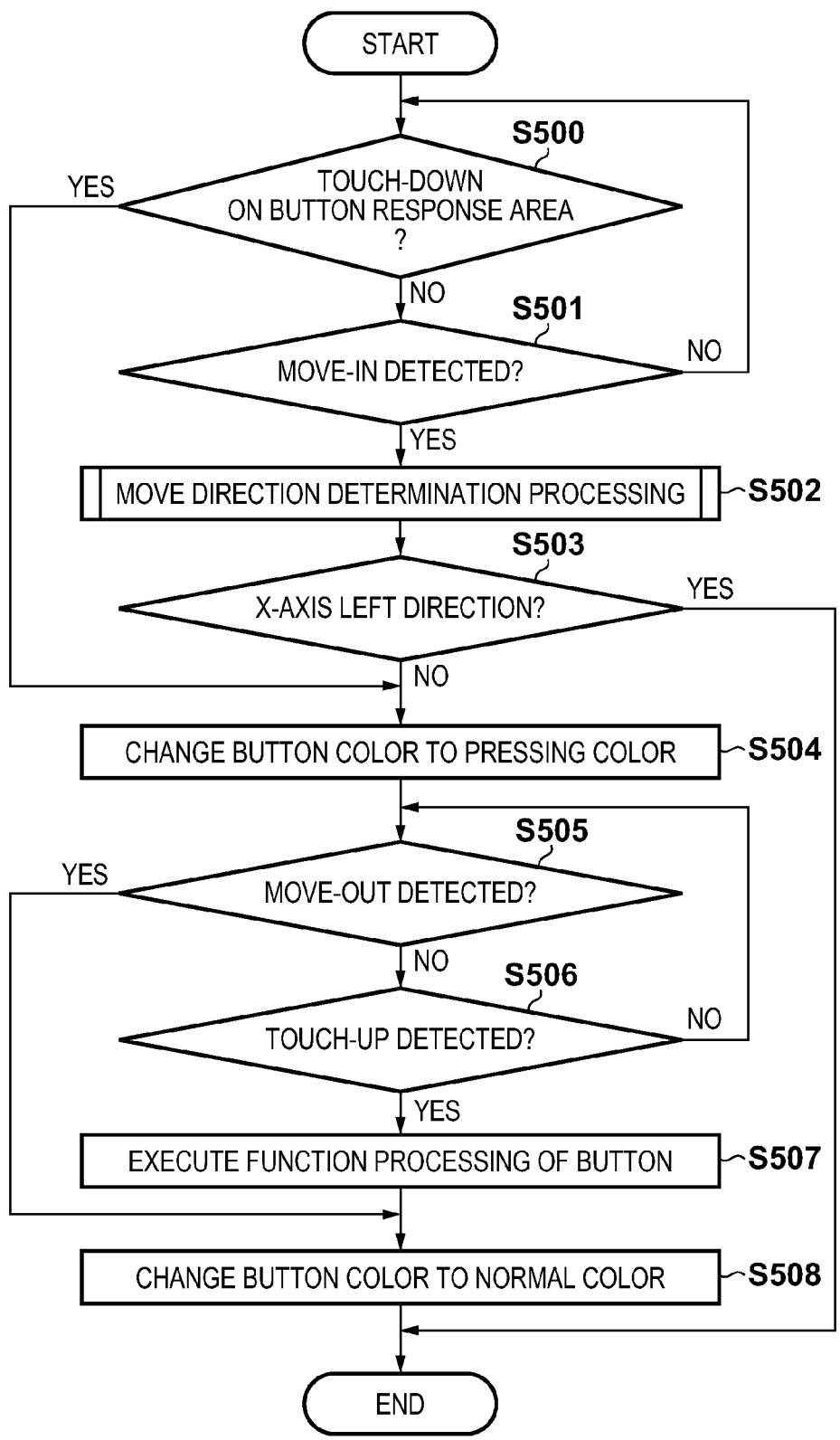
FIG. 5 is a flowchart showing touch processing according to the first embodiment.

Touch processing according to this embodiment will be described below with reference to FIG. 5. Note that the processing shown in FIG. 5 is implemented when the system control unit 101 reads out a program recorded in the non-volatile memory 114 onto the system memory 113 and executes the readout program. In the processing shown in FIG. 5, an operation for the aforementioned FUNC button 202 will be explained.

Referring to FIG. 5, the system control unit 101 determines in step S500 whether or not a touch-down action for the button response area of the FUNC button 202 is detected. If the touch-down action is detected, the process jumps to step S504; otherwise, the process advances to step S501.

The system control unit 101 determines in step S501 whether or not a move-in action to the button response area of the FUNC button 202 is detected by move detection processing. If the system control unit 101 determines that the move-in action is detected (the move-in action to the button response area is detected), the process advances to step S502, and the system control unit 101 executes move direction determination processing (to be described later with reference to FIG. 6); otherwise, the process returns to step S500.

If the system control unit 101 determines in step S503 as a result of the move direction determination processing that the move direction is an X-axis left direction (YES in step S503), it determines an erroneous operation to invalidate that button operation without executing the function assigned to the button, thus ending the processing. If the move direction is not the X-axis left direction (NO in step S503), the system control unit 101 determines a valid operation for the button, and the process advances to step S504.

In step S504, the system control unit 101 changes the color of the button to that of a button operated state (a touch-on state for the FUNC button 202), thus visually informing the user of a valid button operation.

The system control unit 101 determines in step S505 whether or not a move-out action is detected while the button operated state is continued. If the move-out action is detected, the system control unit 101 invalidates the touch operation. That is, even when the user makes a touch-up action later, the function of the FUNC button 202 is not executed. On the other hand, if a touch-up action is detected without any move-out action (YES in step S506), the system control unit 101 executes function processing assigned to the FUNC button 202 (step S507). That is, the system control unit 101 displays the camera function setting screen on the display unit 111. After execution of the function assigned to the FUNC button 202, the system control unit 101 returns the button color to a normal color (step S508), thus ending the processing.

<Move Direction Determination Processing>

The move direction determination processing in step S502 of FIG. 5 will be described below with reference to FIG. 6.

Figure 6:
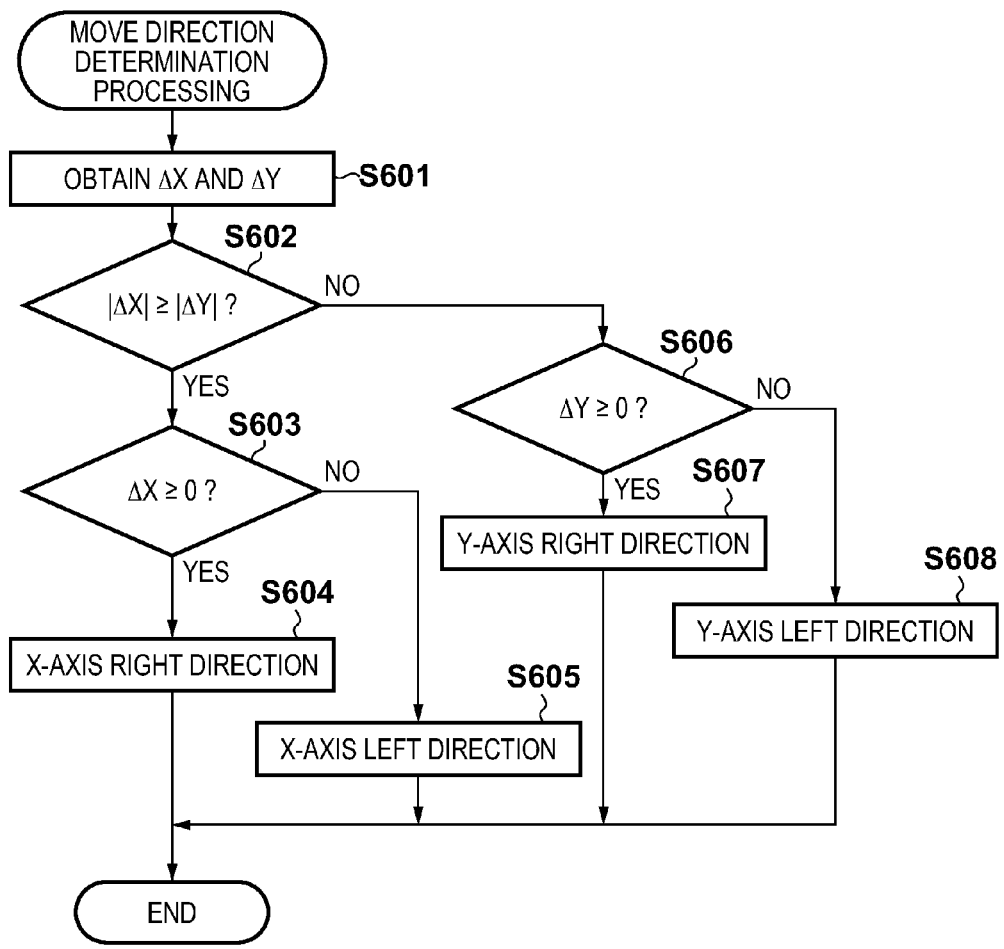
FIG. 6 is a flowchart showing move direction determination processing.

Referring to FIG. 6, the system control unit 101 obtains coordinate displacements $\Delta X$ and $\Delta Y$ between a move-in detection time T2 and previous detection time T1 (step S601). That is, the move-in detection time T2 is a timing at which it is determined that the move-in action is detected, and coordinates of a touch position detected at that timing are (X2, Y2). The previous detection time T1 is a timing before detection of the move action, and coordinates of a touch position detected at this timing are (X1, Y1). $\Delta X$ and $\Delta Y$ are calculated based on these coordinates (X2, Y2) and (X1, Y1), as described above.

Next, the system control unit 101 compares the absolute values of the X-coordinate displacement $\Delta X$ and Y-coordinate displacement $\Delta Y$ (step S602). If $|\Delta X| \geq |\Delta Y|$, the system control unit 101 determines the move action in the X-axis direction; if |ΔX|<|ΔY|, it determines the move action in the Y-axis direction. In case of the move action in the X-axis direction, the system control unit 101 determines the sign of the displacement of X-axis direction components (step S603). If the displacement assumes a positive value, the system control unit 101 determines the move action in the X-axis right direction (step S604); if it assumes a negative value, the system control unit 101 determines the move action in the X-axis left direction (step S605). On the other hand, in case of the move action in the Y-axis direction, the system control unit 101 determines the sign of the displacement of Y-axis direction components (step S606). If the displacement assumes a positive value, the system control unit 101 determines the move action in the Y-axis down direction (step S607); if it assumes a negative value, the system control unit 101 determines the move action in the Y-axis up direction (step S608).

As described above, according to this embodiment, the move direction is detected, and a button operation from a specific direction is invalidated, thus preventing execution of the function by an erroneous operation. Note that FIGS. 5 and 6 have been described as the processing for the FUNC button 202. The FUNC button 202 is displayed at the upper right corner of the display unit 111 (touch panel 123), as shown in FIG. 2A. This position is readily touched by mistake by the thumb of the right hand that holds the grip portion of the camera body 200, as shown in FIG. 2B, and an erroneous operation is readily made for the touch button at this position. Therefore, as described above, since the function of the FUNC button 202 is inhibited from being executed by a touch that moves in from the grip portion side, an erroneous operation can be effectively suppressed. Conversely, for the touch button (for example, the shooting mode button 203) which is laid out at a position which is hardly touched by mistake by the hand that holds the camera body 200, a button operation is valid in response to move-in actions in every directions. Note that the grip portion is a portion which allows the user to hold the camera body 200 while the index finger of the right hand is placed on the shutter button 116, as shown in FIG. 2B, in case of the image capturing apparatus.

However, since the shooting mode button 203 is also located in the vicinity of the end portion of the screen (upper left corner), when the user holds the camera body 200 by both the hands, it may be touched by mistake by the finger of the left hand that holds the camera body 200. For this reason, control may be made to invalidate a button operation by a move-in action from the left, contrary to the case of the FUNC button 202. That is, the move-in direction in which a button operation is invalidated varies depending on layout positions of the touch buttons, and a move-in action from the end portion of the screen from the side close to the button layout position may be invalidated.

FIG. 2B shows the example when the user holds the camera body 200 at a landscape position (regular position). However, when the user holds the camera body 200 at a portrait position, the way he or she holds the camera may be changed, and positions readily touched by mistake may be different from those at the landscape position. Hence, when an attitude detection sensor (not shown) included in the camera 100 detects a change of the holding direction of the camera body 200, the touch button, a button operation of which is invalidated in response to a move-in action from the specific direction, may be changed to another button in correspondence with the attitude. Alternatively, the move-in direction to be invalidated may be changed.

Furthermore, in FIG. 5 described above, when the touch-on state (a state in which NO is determined in both steps S505 and S506) to the button response area is continued for the predetermined time period (about several seconds) or longer after step S504, that touch may be invalidated since it is considered that the touch is not intended by the user. When the touch is invalidated, even when a touch-up action from the button response area is then detected, the function of that button is not executed.

Second Embodiment

The second embodiment will explain a method of invalidating a button operation from a specific direction by arranging two button response areas to be adjacent to each other so as to detect a move direction.

Figure 7:
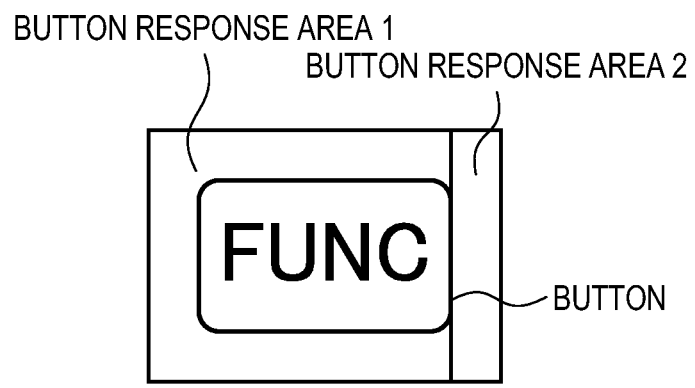
FIG. 7 is a view showing a button response area according to the second embodiment.

FIG. 7 shows the relationship between a button displayed on the touch panel of the display unit and button response areas associated with that button.

Referring to FIG. 7, a button response area 1 (first area) and button response area 2 (second area) are arranged to be adjacent to each other, and the button response area 2 is mainly used to determine a move direction. In order to allow to detect a move direction in which a touch operation is to be invalidated, that is, a move-in action from the right direction in this embodiment, the button response area 2 is laid out to be adjacent to the right side of the button response area 1. By invalidating a button operation upon detection of a move action from the button response area 2 to the button response area 1, execution of a function by an erroneous operation can be prevented. Note that the display range of the FUNC button 202 does not overlap the button response area 2 to fall within the range of the button response area 1, but the display range may overlap the button response area 2. In this case, the display range of the FUNC button 202 overlaps both the button response areas 1 and 2.

Figure 8:
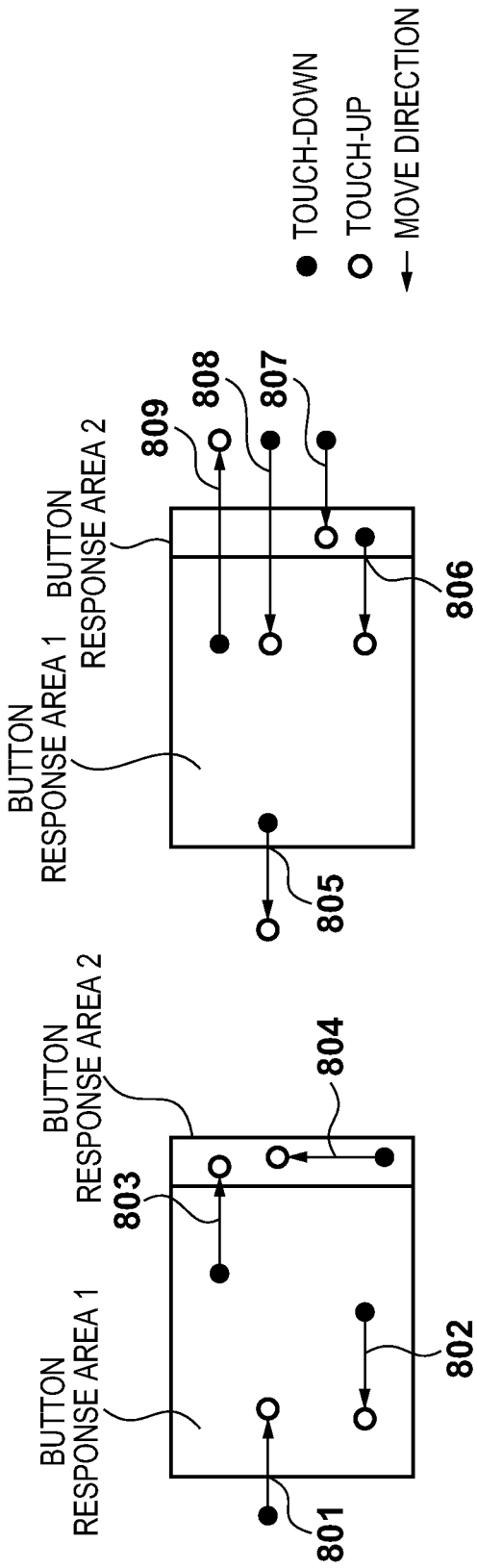
FIGS. 8A and 8B are views for explaining a touch determination method according to the second embodiment.

FIGS. 8A and 8B are views for explaining cases of valid and invalid button operations in the relationship between the button and button response areas shown in FIG. 7.

FIG. 8A shows a case of valid button operations. A button operation is valid when a touch-down action is detected on an area other than the button response areas 1 and 2, a move-in action to the button response area 1 is detected, and a touch-up action from the button response area 1 is then detected (801). Also, a button operation is valid when a touch-down action is detected on the button response area 1, a move action is detected within the button response area 1 (a move action may be skipped), and a touch-up action from the button response area 1 is further detected (802). Furthermore, a button operation is valid when a touch-down action is detected on the button response area 1, a move-in action from the button response area 1 to the button response area 2 is detected, and a touch-up action from the button response area 2 is detected (803). Moreover, a button operation is valid when a touch-down action is detected on the button response area 2, a move action is detected within the button response area 2 (a move action may be skipped), and a touch-up action from the button response area 2 is further detected (804). In the aforementioned cases, the button operation is valid, and the function assigned to the button is executed after the touch-up action.

FIG. 8B shows cases of an invalid button operation. A button operation is invalid when a touch-down action is detected on the button response area 1, and a move-out action to an area other than the button response areas 1 and 2 and a touch-up action are detected (805). Also, a button operation is invalid when a touch-down action is detected on the button response area 2, a move-in action from the button response area 2 to the button response area 1 is detected, and a touch-up action from the button response area 1 is detected (806). Furthermore, a button operation is invalid when a touch-down action is detected on an area other than the button response areas 1 and 2, a move-in action to the button response area 2 is detected, and a touch-up action from the button response area 2 is detected (807). Moreover, a button operation is invalid when a touch-down action is detected on an area other than the button response areas 1 and 2, and a move-in action to the button response area 1 via the button response area 2 and a touch-up action are detected (808). In addition, a button operation is invalid when a touch-down action is detected on the button response area 1, and a touch-up action from an area other than the button response areas 1 and 2 is detected via the button response area (809). In the aforementioned cases, the button operation is invalid, and the function assigned to the button is not executed even after the touch-up action.

<Touch Processing>

Figure 9:
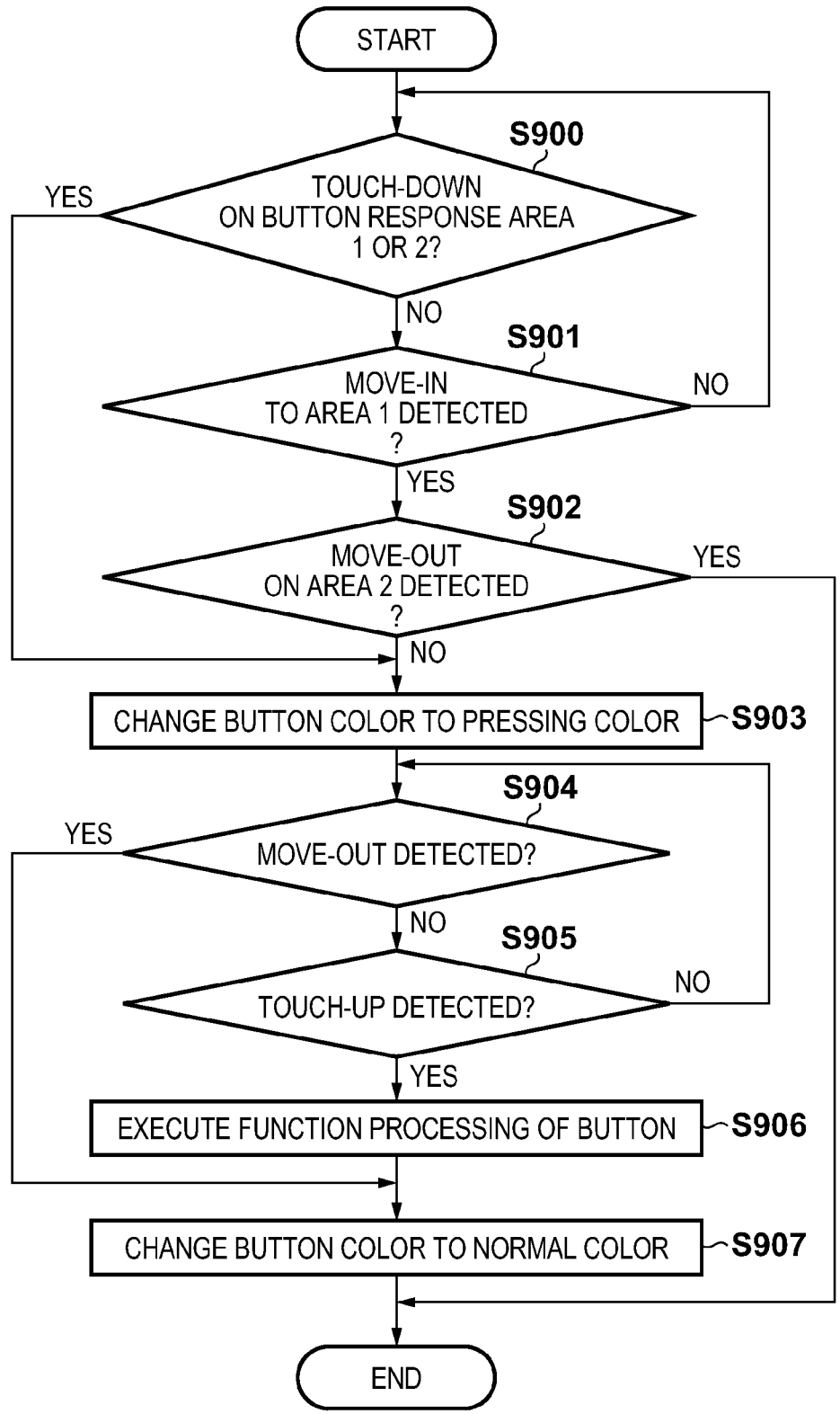
FIG. 9 is a flowchart showing touch processing according to the second embodiment.

Touch processing according to this embodiment will be described below with reference to FIG. 9. Note that the processing shown in FIG. 9 is implemented when the system control unit 101 reads out a program recorded in the non-volatile memory 114 onto the system memory 113 and executes the readout program. In the processing shown in FIG. 9, an operation for the aforementioned FUNC button 202 will be explained.

Referring to FIG. 9, the system control unit 101 determines in step S900 whether or not a touch-down action to the button response area 1 or 2 of the FUNC button 202 is detected. If a touch-down action is detected, the process jumps to step S903; otherwise, the process advances to step S901.

The system control unit 101 determines in step S901 whether or not a move-in action to the button response area 1 is detected. If a move-in action to the button response area 1 is detected, the process advances to step S902; otherwise, the process returns to step S900.

The system control unit 101 determines in step S902 whether or not a move-out action on the button response area 2 is detected at an immediately preceding timing. If a move-out action is detected on the button response area 2 (YES in step S902), the system control unit 101 determines an erroneous operation by the user, and invalidates the button operation without executing the function assigned to the button, thus ending this processing. On the other hand, if no move-out action on the button response area 2 is detected (NO in step S902), the system control unit 101 validates the touch operation, and the process advances to step S903. Then, in processes of steps S903 to S907, if a touch-up action from the button response area 1 or 2 is detected, the function assigned to the FUNC button 202 is executed. Steps S903 to S907 are the same as steps S504 to S508 in FIG. 5, and a detailed description thereof will not be repeated. Note that even when a move action from the button response area 2 to the button response area 1 is detected in step S904, it is determined as a move-out action, and the process jumps to step S907 (a move-out action from the button response area 2).

As described above, according to this embodiment, the two button response areas are arranged to be adjacent to each other, so as to detect a move direction, and a button operation from a specific direction is invalidated, thus preventing execution of a function by an erroneous operation. Also, when the user directly touches the button response area 2 intentionally, the button function can be executed. In the second embodiment, since a touch valid area which is not a button response area need not be laid out on the left side of the FUNC button 202, the button response area can be laid out to be closer to the end of the screen compared to the first embodiment. For this reason, since the FUNC button 202 can be displayed to be closer to the end of the screen compared to the first embodiment, the user can visually confirm a principal image (object image or the like) near the center of the screen more easily.

Note that the aforementioned processing of the second embodiment is executed for the FUNC button 202 as in the first embodiment. That is, for a touch button (for example, the shooting mode button 203) which is laid out at a position which is hardly touched by mistake by the hand that holds the camera body 200, a button operation is valid in response to move-in actions in every directions without dividing the button response area into two.

Also, contrary to the case of the FUNC button 202, control may be made to invalidate a button operation by a move-in action from the left. That is, the layout of the button response area 2 with respect to the button response area 1 varies depending on a layout position of a touch button, and the button response area 2 may be laid out on the end portion side of the screen on the side close to the button layout position.

Also, when an attitude detection sensor (not shown) included in the camera 100 detects a change of the holding direction of the camera body 200, the touch button for which the button response area is divided into two like the FUNC button 202 may be changed to another button in correspondence with the attitude. Alternatively, the layout position of the button response area 2 with respect to the button response area 1 may be changed.

Furthermore, in FIG. 9 described above, when the touch-on state (a state in which NO is determined in both steps S904 and S905) to the button response area is continued for the predetermined time period (about several seconds) or longer after step S903, that touch may be invalidated since it is considered that the touch is not intended by the user. When the touch is invalidated, even when a touch-up action from the button response area is then detected, the function of that button is not executed.

Third Embodiment

The third embodiment will explain a method of invalidating a button operation from a specific direction by arranging two touch response areas which are separated by a line that contacts a button response area, so as to detect a move start position (that is, a touch-down detection position).

FIG. 10 shows the relationship between a button displayed on the touch panel of the display unit and a button response area associated with that button.

Referring to FIG. 10, a touch response area 1 (first area) and touch response area 2 (second area) are defined to be separated as left and right areas by a border line L which contacts the right side of a button response area. As in the above embodiment, execution of a function by an erroneous operation can be prevented by invalidating a button operation by detecting a move-in action from the right side.

FIGS. 11A and 11B are views for explaining cases of valid and invalid button operations in the relationship among the button, button response area, and touch response areas shown in FIG. 10.

FIG. 11A shows a case of valid button operations. When a move start position is located on the touch response area 1 outside the button response area, and a move-in action to the button response area and a touch-up action are detected, a button operation is valid, and a function assigned to the button is executed.

FIG. 11B shows a case of an invalid button operations. When a move start position is located on the touch response area 2, even when a move-in action to the button response area is detected, a button operation is invalid, and the function assigned to the button is not executed.

<Touch Processing>

Touch processing according to this embodiment will be described below with reference to FIG. 12. Note that the processing shown in FIG. 12 is implemented when the system control unit 101 reads out a program recorded in the nonvolatile memory 114 onto the system memory 113 and executes the readout program.

Figure 12:
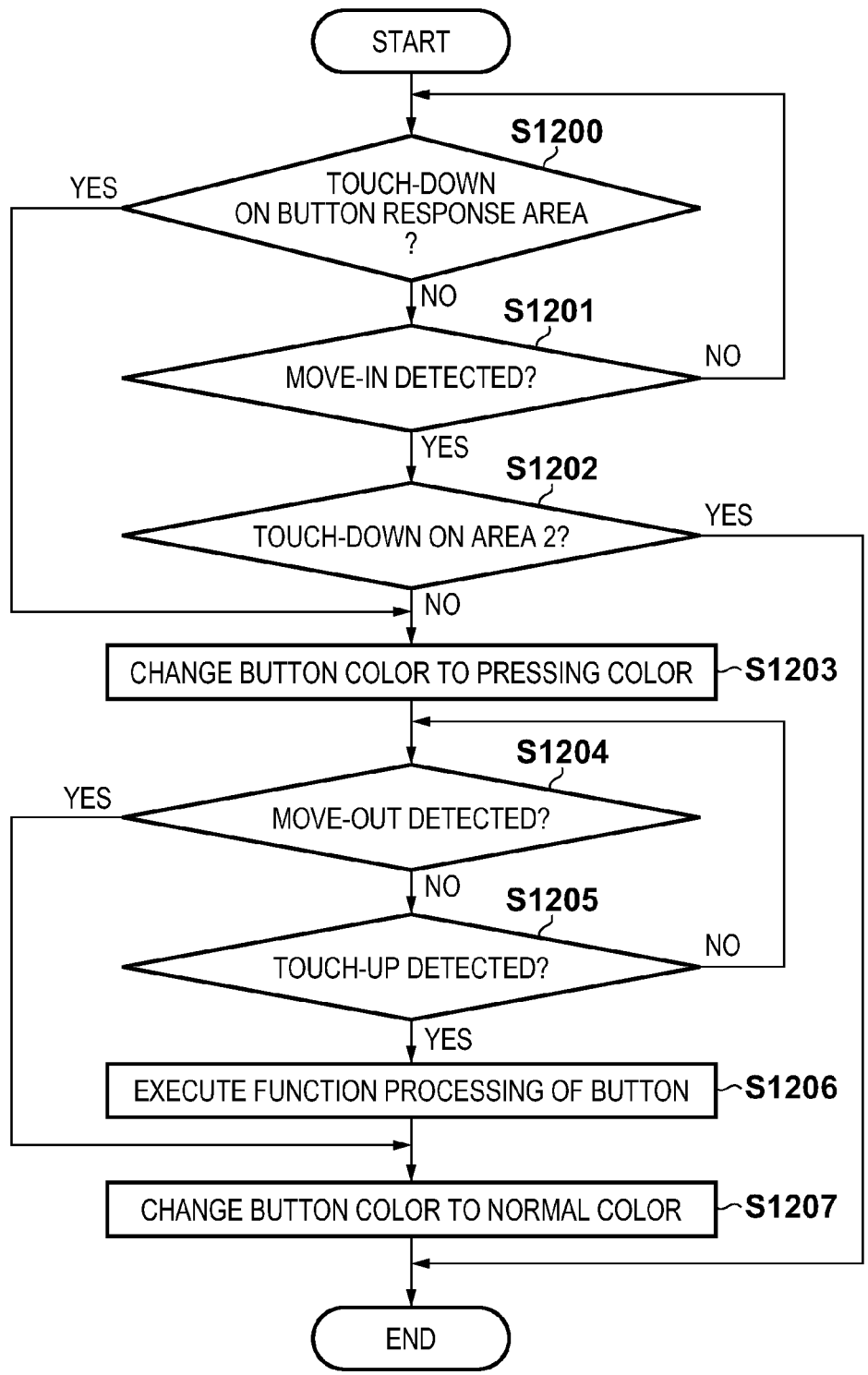
FIG. 12 is a flowchart showing touch processing according to the third embodiment.

Referring to FIG. 12, the system control unit 101 determines in step S1200 whether or not a touch-down action to the button response area of the FUNC button 202 is detected. If a touch-down action is detected, the process jumps to step S1203; otherwise, the process advances to step S1201.

The system control unit 101 determines in step S1201 whether or not a move-in action is detected on the button response area. If a move-in action is detected, the process advances to step S1202; otherwise, the process returns to step S1200.

In step S1202, the system control unit 101 determines a move start position (a touch position at the touch-down timing). If coordinates of the move start position are located on the touch response area 2 (YES in step S1202), the system control unit 101 determines an erroneous operation of the user to invalidate the touch operation without executing the function assigned to the button, thus ending the processing. On the other hand, if the coordinates of the move start position are located on the touch response area 1 (NO in step S1202), the system control unit 101 validates the touch operation, and the process advances to step S1203. Then, if a touch-up action from the button response area is detected in processes of steps S1203 to S1207, the system control unit 101 executes the function assigned to the FUNC button 202. Note that since steps S1203 to S1207 are the same as steps S504 to S508 in FIG. 5, and a description thereof will not be repeated.

Figure 13:
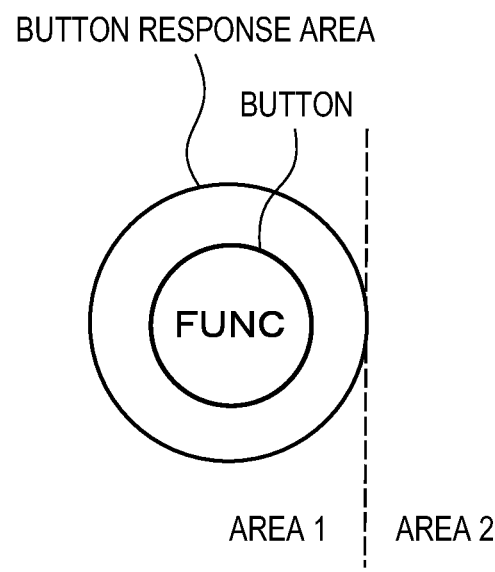
FIG. 13 is a view showing another example of a button response area according to the third embodiment.

Note that the third embodiment has exemplified the rectangular button response area, but the shape of the button response area is not particularly limited. For example, when a move-in action from the right direction is inhibited with respect to a circular button response area shown in FIG. 13, areas 1 and 2 may be defined by separating them using a line in the Y-axis direction that contacts the rightmost coordinates of the button response area.

As described above, according to this embodiment, since the two touch response areas which are separated by the line that contacts the button response area is arranged, the move start position is determined to invalidate a button operation from a specific direction, thus preventing execution of the function by an erroneous operation.

Note that the aforementioned processing of the third embodiment is executed for the FUNC button 202 as in the first embodiment. That is, for a touch button (for example, the shooting mode button 203) which is laid out at a position which is hardly touched by mistake by the hand that holds the camera body 200, a button operation is valid in response to move-in actions irrespective of touch-down positions of move-in actions to the button response area.

Also, contrary to the case of the FUNC button 202, control may be made to invalidate a button operation by a move-in action from the left. That is, the layout of the touch response area 2 with respect to the touch response area 1 varies depending on a layout position of a touch button, and the touch response area 2 may be laid out on the end portion side of the screen on the side close to the button layout position.

Also, when an attitude detection sensor (not shown) included in the camera 100 detects a change of the holding direction of the camera body 200, the touch button which invalidates a move-in action from a touch-down action on the adjacent area 2 like the FUNC button 202 may be changed to another button in correspondence with the attitude. Alternatively, the layout position of the area 2 with respect to the area 1 may be changed.

Furthermore, in FIG. 12 described above, when the touch-on state (a state in which NO is determined in both steps S1204 and S1205) to the button response area is continued for the predetermined time period (about several seconds) or longer after step S1203, that touch may be invalidated since it is considered that the touch is not intended by the user. When the touch is invalidated, even when a touch-up action from the button response area is then detected, the function of that button is not executed.

Fourth Embodiment

On a compact electronic apparatus such as a camera and mobile phone, it is desirable to layout display items such as buttons at an end portion of a screen so as not to disturb an image displayed on a display unit as much as possible. The first embodiment has explained the method of invalidating a button operation from a specific direction by detecting a move direction. However, for example, when a touch response area contacts a frame member which surrounds the display unit, the method of the first embodiment cannot detect the move direction for the following reasons.

In FIG. 15A, letting P1, P2, and P3 be coordinates at three successive times T1, T2, and T3 of a touch coordinate detection period, no touch is detected since the user touches the frame member 201 that does not respond to any touch at P1. At P2, since a touch non-detection state changes to a touch detection state, a touch-down action is detected. At P3, a move action having P2 as a move start position is detected. However, since a move-in action to the button response area is not detected, a move direction cannot be detected.

In order to solve such problem, in this embodiment, when the button response area of the first embodiment is laid out to be adjacent to the end portion of the touch panel, an area used to determine a move direction is arranged to invalidate a button operation from a specific direction.

Figure 14:
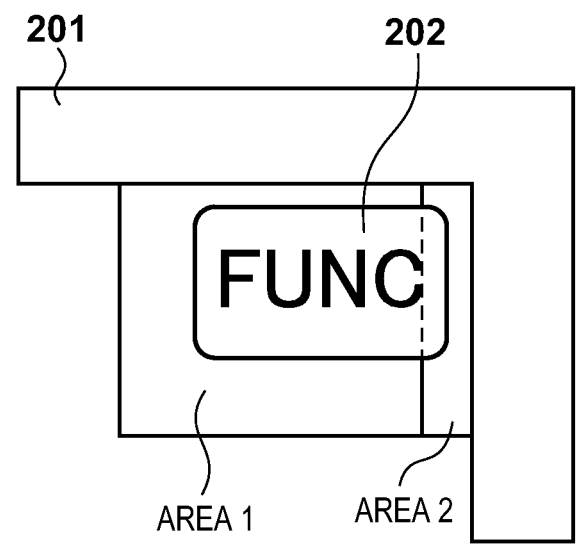
FIG. 14 is a view showing a button response area according to the fourth embodiment.

FIG. 14 shows the relationship between the FUNC button 202 displayed on the touch panel of the display unit and a button response area associated with that button.

Referring to FIG. 14, a touch response area 1 (first area) also serves as a button response area. An area 2 (second area) adjacent to the touch response area 1 is a touch response area arranged to detect a move direction. A display range of the FUNC button 202 overlap both the areas 1 and 2.

FIG. 15B is a view for explaining cases of invalid button operations in the relationship among the button, button response area, and touch response areas shown in FIG. 14.

Referring to FIG. 15B, since the user touches the frame member 201 that does not respond to a touch at P1, no touch is detected. At P2, since a touch non-detection state changes to a touch detection state on the area 2, a touch-down action is detected, but since the area 2 is not a button response area, no touch to the button is detected. At P3, a move-in action to the response area 1 from P2 is detected. Touch processing at that time is the same as that described in FIG. 5, and a move action from the right direction is detected at P3, thus invalidating the touch operation.

Also, when the area 2 is defined as a button response area, and when a move action to the response area 1 from the right direction where the area 2 is located is detected, the touch operation is invalidated. Touch processing at that time is the same as steps S903 to S907 in FIG. 9.

Note that even when the move direction is not detected as in this embodiment, a move-in action to the button response area is invalidated to prevent an erroneous operation. FIG. 15A shows a case in which there is no area 2 in FIG. 14. Independently of a valid/invalid move-in action to the response area 1, if a touch-down action is detected at P2, touch processing is unwantedly executed by the touch-down action. Hence, when the area 2 is laid out to be adjacent to the response area 1, as shown in FIG. 15B, since a move-in action is detected at P3, this move-in action is invalidated, thus preventing execution of the function by the touch operation from the area 2 even when no move direction is detected.

As described above, according to this embodiment, when the button response area is adjacent to the end portion of the touch panel, the area required to determine the move direction is arranged to invalidate a button operation from a specific direction, thereby preventing execution of the function by an erroneous operation.

Note that a single item of hardware may control the system control unit 101, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to a digital camera, the present invention is not limited to this example. The present invention is applicable to, for example, an apparatus by which a touch input can be performed. More specifically, the present invention is applicable to personal computers, PDAs, a mobile telephone terminal, a mobile image viewer, a printer having a display, a digital photo frame, a music player, a game console, an electronic book reader, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-144589, filed Jun. 27, 2012, which is hereby incorporated by reference herein in its entirety.

What is claimed is:

1. An electronic apparatus comprising:
   a touch-screen device which can display one or more icons;
   a touch detection unit configured to detect a touch operation on the touch-screen device;
   a display control unit configured to control to display a specific display item on the touch-screen device, wherein the specific display item represents a specific function and overlaps at least a portion of a first area and at least a portion of a second area, the first area and the second area do not overlap each other on the touch-screen device; and
   a control unit configured to control to execute the specific function in response to a touch operation as a touch at a position in a first area, at least a portion of which is included in a display area of the specific display item, and
   to control not to execute the specific function in response to a touch operation as a touch at a position in a second area, at least a portion of which is included in a display area of the specific display item,
   wherein the specific function is not executed when a touch is made in the second area, even if the touch occurs in the display area of the specific display item, and
   wherein the specific function is not executed when a touch-up occurs in the first area after a move-in action occurs from the second area to the first area.

2. The apparatus according to claim 1, wherein said control unit controls to execute the specific function in response to a touch operation as a touch is made at a position in the first area and the touch is released without moving a touch position thereof to outside the first area, and
   said control unit controls not to execute the specific function in response to a touch operation as a touch is made at a position in the second area, and the touch is released in the first area after a touch position of that touch is moved into the first area.

3. The apparatus according to claim 1, wherein the first area and the second area are adjacent areas in the display area of the specific display item.

4. The apparatus according to claim 1, wherein the second area is an area located at a position closer to an end of the touch-screen device than the first area, the end is proximate to a position in which the specific display item is displayed, and is positioned in a direction of the second area from the first area.

5. The apparatus according to claim 1, wherein the second area is an area adjacent to an end of the touch-screen device, the end is proximate to a position in which the specific display item is displayed, and is positioned in a direction of the second area from the first area.

6. The apparatus according to claim 1, wherein the second area is an area located at a position closer to a grip portion of said electronic apparatus than the first area.

7. The apparatus according to claim 1, further comprising an image capturing unit.

8. The apparatus according to claim 7, further comprising a shutter operation member configured to instruct said image capturing unit to capture an image, wherein the second area is an area located at a position closer to said shutter operation member than the first area.

9. The apparatus according to claim 7, wherein said display control unit controls to display the specific display item on the touch-screen device together with a through-the lens-image as an image obtained by sequentially displaying an image captured by said image capturing unit.

10. The apparatus according to claim 1, wherein said electronic apparatus is at least one of a personal computer, a mobile phone terminal, a portable image viewer, a printer apparatus comprising a display, a digital photo frame, a music player, a game machine, and an electronic book reader.

11. An electronic apparatus comprising:
a touch-screen device which can display one or more icons;
a touch detection unit configured to detect a touch operation on the touch-screen device;
a display control unit configured to control to display a specific display item on the touch-screen device, wherein the specific display item represents a specific function and overlaps at least a portion of a first area, the first area and a second area do not overlap each other on the touch-screen device; and
a control unit configured to control to execute the specific function when a touch is made at a position in the first area on the touch-screen device, and a touch-up occurs without a move-out action occurs from the first area to outside the first area,
to control to execute the specific function when a touch is made at a position in the second area on the touch-screen device, and a touch-up occurs without a move-out action occurs from the second area to outside the second area,
to control to execute the specific function when a touch is made at a position in the first area on the touch-screen device, and a move-in action occurs from the first area to the second area, and a touch-up occurs on the second area, and
to control not to execute the specific function when a touch is made at a position in a second area on the touch-screen device, and a move-in action occurs from the second area to the first area, and a touch-up occurs on the first area.

12. The apparatus according to claim 11, wherein the first area and the second area are areas which are adjacent to each other.

13. The apparatus according to claim 11, wherein the second area is an area located at a position closer to an end of the touch-screen device than the first area.

14. The apparatus according to claim 11, wherein the second area is an area adjacent to an end of the touch-screen device.

15. The apparatus according to claim 11, wherein the second area is an area located at a position closer to a grip portion of said electronic apparatus than the first area.

16. The apparatus according to claim 11, further comprising an image capturing unit.

17. The apparatus according to claim 16, further comprising a shutter operation member configured to instruct said image capturing unit to capture an image, wherein the second area is an area located at a position closer to said shutter operation member than the first area.

18. The apparatus according to claim 16, wherein the specific display item related to the specific function is displayed on the touch-screen device together with a through-the lens-image as an image obtained by sequentially displaying an image captured by said image capturing unit.

19. The apparatus according to claim 11, wherein said electronic apparatus is at least one of a personal computer, a mobile phone terminal, a portable image viewer, a printer apparatus comprising a display, a digital photo frame, a music player, a game machine, and an electronic book reader.

20. The apparatus according to claim 11, wherein when a touch is made at a position outside a third area and a position which is different from the first area and the second area on the touch-screen device, to which area a second function different from the specific function is assigned and which is located at a position different from the first area and the second area, and a touch position of the touch moves into the third area without releasing the touch, said control unit controls to execute the second function irrespective of a direction of the move.

21. The apparatus according to claim 11, further comprising an attitude detection unit configured to detect an attitude of said electronic apparatus,
wherein said control unit controls to execute the control for areas to which different functions are assigned in accordance with the attitude detected by said attitude detection unit.

22. The apparatus according to claim 11, further comprising an attitude detection unit configured to detect an attitude of said electronic apparatus,
wherein said control unit controls to change a layout of the first area and the second area according to the attitude detected by said attitude detection unit.

23. The apparatus according to claim 11, wherein when a touch is made and kept on the first area or the second area for not less than a predetermined time period, said control unit does not execute the specific function irrespective of movement of the touch position.

24. A control method of an electronic apparatus comprising a touch-screen device which can display one or more icons, comprising:
a touch detection step, performed by a touch detection unit, of detecting a touch operation on the touch-screen device;
a display control step of controlling to display a specific display item on the touch-screen device, wherein the specific display item represents a specific function and overlaps at least a portion of a first area and at least a portion of a second area, the first area and the second area do not overlap each other on the touch-screen device; and
a control step of controlling to execute a specific function in response to a touch operation as a touch at a position in a first area, at least a portion of which is included in a display area of the specific display item, and
controlling not to execute the specific function in response to a touch operation as a touch at a position in a second area, at least a portion of which is included in a display area of the specific display item,
wherein said display control step and said control step are performed by a processor, wherein the specific function is not executed when a touch is made in the second area, even if the touch occurs in the display area of the specific display item, and wherein the specific function is not executed when a touch-up occurs in the first area after a move-in action occurs from the second area to the first area.

25. A control method of an electronic apparatus comprising a touch-screen device which can display one or more icons, comprising:

a touch detection step, performed by a touch detection unit, of detecting a touch operation on the touch-screen device;

a display control step of controlling to display a specific display item on the touch-screen device, wherein the specific display item represents a specific function and overlaps at least a portion of a first area, the first area and a second area do not overlap each other on the touch-screen device; and a control step, performed by a processor, of controlling to execute the specific function when a touch is made at a position in the first area on the touch-screen device, and a touch-up occurs without a move-out action occurs from the first area to outside the first area, controlling to execute the specific function when a touch is made at a position in the second area on the touch-screen device, and a touch-up occurs without a move-out action occurs from the second area to outside the second area, controlling to execute the specific function when a touch is made at a position in the first area on the touch-screen device, and a move-in action occurs from the first area to the second area, and a touch-up occurs on the second area, and controlling not to execute the specific function when a touch is made at a position in a second area on the touch-screen device, and a move-in action occurs from the second area to the first area, and a touch-up occurs on the first area.

26. A non-transitory computer-readable storage medium storing a program for causing a computer to execute a control method of an electronic apparatus comprising a touch-screen device which can display one or more icons, said method comprising:

a touch detection step, performed by a touch detection unit, of detecting a touch operation on the touch-screen device;

a display control step of controlling to display a specific display item on the touch-screen device, wherein the specific display item represents a specific function and overlaps at least a portion of a first area and at least a portion of a second area, the first area and the second area do not overlap each other on the touch-screen device; and a control step of controlling to execute a specific function in response to a touch operation as a touch at a position in a first area, at least a portion of which is included in a display area of the specific display item, and controlling not to execute the specific function in response to a touch operation as a touch at a position in a second area, at least a portion of which is included in a display area of the specific display item, wherein said display control step and said control step are performed by a processor, wherein the specific function is not executed when a touch is made in the second area, even if the touch occurs in the display area of the specific display item, and wherein the specific function is not executed when a touch-up occurs in the first area after a move-in action occurs from the second area to the first area.

27. A non-transitory computer-readable storage medium storing a program for causing a computer to execute a control method of an electronic apparatus comprising a touch-screen device which can display one or more icons, said method comprising:

a touch detection step, performed by a touch detection unit, of detecting a touch operation on the touch-screen device;

a display control step of controlling to display a specific display item on the touch-screen device, wherein the specific display item represents a specific function and overlaps at least a portion of a first area, the first area and a second area do not overlap each other on the touch-screen device; and a control step, performed by a processor, of controlling to execute the specific function when a touch is made at a position in the first area on the touch-screen device, and a touch-up occurs without a move-out action occurs from the first area to outside the first area, controlling to execute the specific function when a touch is made at a position in the second area on the touch-screen device, and a touch-up occurs without a move-out action occurs from the second area to outside the second area, controlling to execute the specific function when a touch is made at a position in the first area on the touch-screen device, and a move-in action occurs from the first area to the second area, and a touch-up occurs on the second area, and controlling not to execute the specific function when a touch is made at a position in a second area on the touch-screen device, and a move-in action occurs from the second area to the first area, and a touch-up occurs on the first area.

* * * * *